March 16, 1954  W. F. NEWBOLD  2,672,151
MEASURING INSTRUMENT
Filed Dec. 7, 1951  2 Sheets-Sheet 1

INVENTOR.
WILLIAM F. NEWBOLD
BY
ATTORNEY.

March 16, 1954

W. F. NEWBOLD

MEASURING INSTRUMENT

Filed Dec. 7, 1951

INVENTOR.
WILLIAM F. NEWBOLD
BY
Arthur H. Swanson
ATTORNEY.

Patented Mar. 16, 1954

2,672,151

UNITED STATES PATENT OFFICE 2,672,151

MEASURING INSTRUMENT

William F. Newbold, Chestnut Hill, Pa., assignor to Minneapolis-Honeywell Regulator Company, Minneapolis, Minn., a corporation of Delaware Application December 7, 1951, Serial No. 260,405

8 Claims. (Cl. 137—86)

It is an object of this invention to provide a measuring instrument which will give a linear output in response to a non-linear input.

More specifically, the measuring instrument of this invention may be said to comprise means for providing a solution to the problem of converting a non-linear input function of the form A plus BX plus $CX^2$ to a linear output.

A further object of this invention is to provide an air-operated instrument for measuring a non-linear function, such as temperature or flow, which instrument has a linear output so that it may be provided with an indicating or recording scale of equal increments.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Theoretical considerations

In the art of instrumentation it is often necessary to measure primary variables or quantities, such as temperature or flow, which are non-linear. Also in the construction of either analog or digital computers it is a basic assumption that the information to be operated on is in a linear form. It is therefore necessary to correct the output of computers when the input to them is in non-linear form. To convert non-linear functions of the form A plus BX plus $CX^2$ to provide a linear output is desirable. Non-linear functions of this form can be described as the sum of three terms: The suppression, span, and correction terms. These terms are independent. The correction term always has the same "shape" no matter what the span or suppression.

A system can be designed having an element which produces a linear effect and a second element which produces a non-linear effect. These elements can be used to measure the non-linear function and the effect of these elements can be varied for different curves and spans. The corrective effect of the non-linear element need only be accurate to second order i. e. a non-linear curve which deviates from a straight line by five percent can be corrected adequately by an element which is 1/20 as accurate as the linear element.

Figure 1:
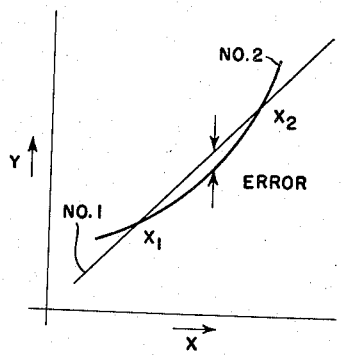
Fig. 1 is a curve useful in explaining this invention.

Fig. 1 shows a generalized curve connecting two functions which are plotted as X and Y. $X_1$ and $X_2$ represent respectively the upper and lower limits of the variations of X which are of interest. The straight line connecting $X_1$ and $X_2$ represents what an instrument with a linear output would read in the interval between $X_1$ and $X_2$. Assume, Y equals A plus BX plus $CX^2$ for curve No. 2. Straight line No. 1 is of the form y equals $ax$ plus b. Examination of Fig. 1 reveals several possibilities. It might be possible to use a linear element between $X_1$ and $X_2$, and, in addition, to subtract the difference between the straight line No. 1 and the curve No. 2 as an error term. In other words, the non-linear curve between $X_1$ and $X_2$ can be described as the sum of a linear term and a non-linear one. In order to determine the form of this error term a somewhat lengthy algebraic derivation is necessary. From this derivation it can be proven that the equation for the straight line connecting $X_1$ and $X_2$ may be written by the utilization of an operator (S) which goes from zero to one in the interval between $X_1$ and $X_2$. S is percentage of scale divided by 100 or per unit of scale. The equation of the non-linear curve No. 2 between $X_1$ and $X_2$ may be written using the same operator. If the two equations are subtracted to find the error term and the non-linear curve written as the straight line equation minus error, the results show that Y equals $C_1$ plus $C_2S$ plus $C_3$ (S minus S squared) (hereinafter written $S^2$), where $C_1$ equals (A plus $BX_1$ plus $CX_1^2$), $C_2$ equals (B) ($X_2$ minus $X_1$) plus C ($X_2^2$ minus $X_1^2$), and $C_3$ equals minus C ($X_2$ minus $X_1$)$^2$.

As written, $C_1$ represents the suppression term, $C_2$ the span term, and $C_3$ the non-linear correction term.

Notice that $C_1$, $C_2$, and $C_3$ were uniquely determined for desired conditions of span and zero. It then appears possible that sufficient information is available from the constants of the equation $A$ plus $BX$ plus $CX^2$ to determine these three constants separately and uniquely. The term—$S$ minus $S^2$—is the non-linear function which is used for correction as $S$ goes from zero to one and the quantity $S$ minus $S^2$ goes from zero to ¼ to zero.

To apply this solution to a pneumatic device, it is desirable to use an accurate measuring instrument for the linear term $C_2$ and to use a force balance system. The error term $C_3$ may be supplied by a receiving bellows operating through a cam or bellows-link-and-spring arrangement to apply a non-linear force to the measuring instrument. The accuracy of this cam or bellows-link-and-spring arrangement need be only ¼ as great as the accuracy of the linearly operating element for the same accuracy of the device.

Diagrammatic exposition

Figure 2:
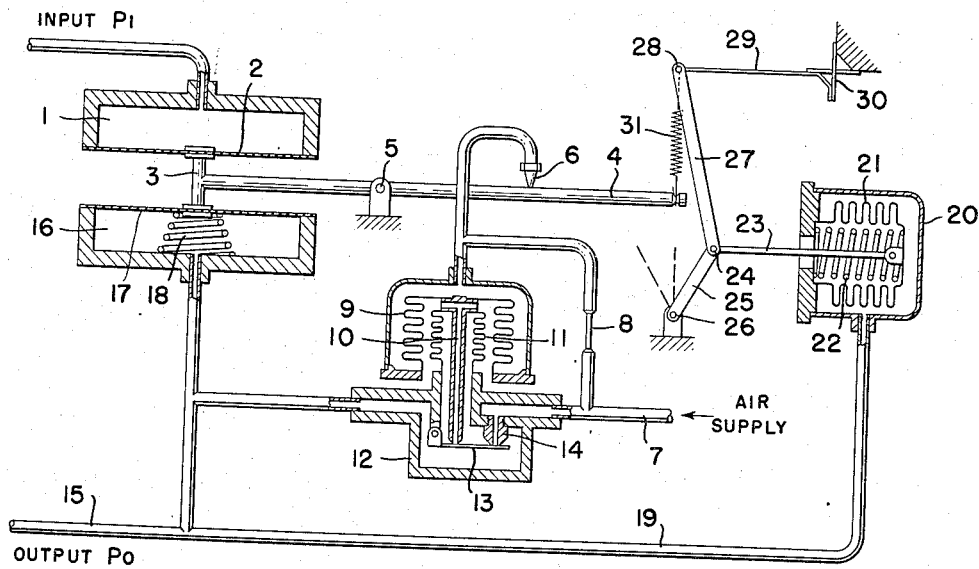
Fig. 2 is a diagrammatic or schematic showing of one form of the invention.

Fig. 2 shows an air-operated measuring instrument constructed according to the foregoing theory. A specific application of this measuring instrument is to meter a flow and to provide an output which varies linearly. The input is a pneumatic pressure $P_1$ which varies as the square of the flow to be measured. $P_1$ is fed to chamber 1 containing diaphragm 2 which bears on a link 3 connected to one end of a beam 4 which is pivoted at 5. Input $P_1$ applies a force $F_1$ to beam 4.

Movement of beam 4 relative to nozzle 6 varies the flow of air from an air supply 7 through a restriction 8 to a bellows 9 forming a motor. Motor 9 operates a T-shaped exhaust valve 10 connected by a sealing bellows 11 to the casing 12 of a pilot valve or relay of a well known, non-bleed type. The base or end of the vertical arm of the T-shaped exhaust valve 10 operates flapper 13 away from nozzle 14 or the T-shaped exhaust valve 10 itself lifts off flapper 13 and permits the exhaust of air through the T-shaped valve. The output pressure $P_0$ of the relay is fed through pipe 15 to an indicator, recorder, or controller, which it operates linearly for the following reasons.

The output pressure $P_0$ is also fed to chamber 16 containing diaphragm 17 and the spring 18, which may be a separate spring or simply the elasticity of the diaphragms 2 or 17. Diaphragm 17 applies a force $F_2$ to link 3 and lever 4. Output pressure $P_0$ is also fed by pipe 19 to a rigid casing 20 which has a bellows 21 and a spring 22 in it. The free or movable end of bellows 21 is connected to a rod 23 which is pivoted at 24 to a linkage which operates to give an output which is proportional within very narrow limits to the cosine of the input. This cosine function, when plotted, appears as a parabola. This linkage consists of a link 25 having a stationary pivot 26. Pivot 26 should have as little friction as possible and for this reason may be a ball bearing or a cross spring pivot formed of two strips of flexible metal. Link 27 connects at its ends to pivot 24 and to pivot 28, pivot 28 forming one end of a link 29 whose opposite end is pivoted on the bearing 30 which may be a ball bearing or cross spring pivot. From pivot 28 a spring 31 connects to the end of beam 4. Bellows 21 and spring 22 supply a force $F_3$ which is proportional to $S$ minus $S$ squared where $S$ is the per unit full scale value of the output pressure, as was explained above. Diaphragm 17 supplies force $F_2$ which is proportional to plus $S$.

The input force $F_1$ is proportional to the input pressure $P_1$. As was shown above in the Theoretical Considerations, $P_0$ is proportional to $S$ minus ($S$ minus $S^2$). In other words, $S$ squared ($S^2$) multiplied by the output pressure ($P_0$) equals the input pressure ($P_1$) when the mechanism shown is in static balance.

Practical embodiment

Figure 3:
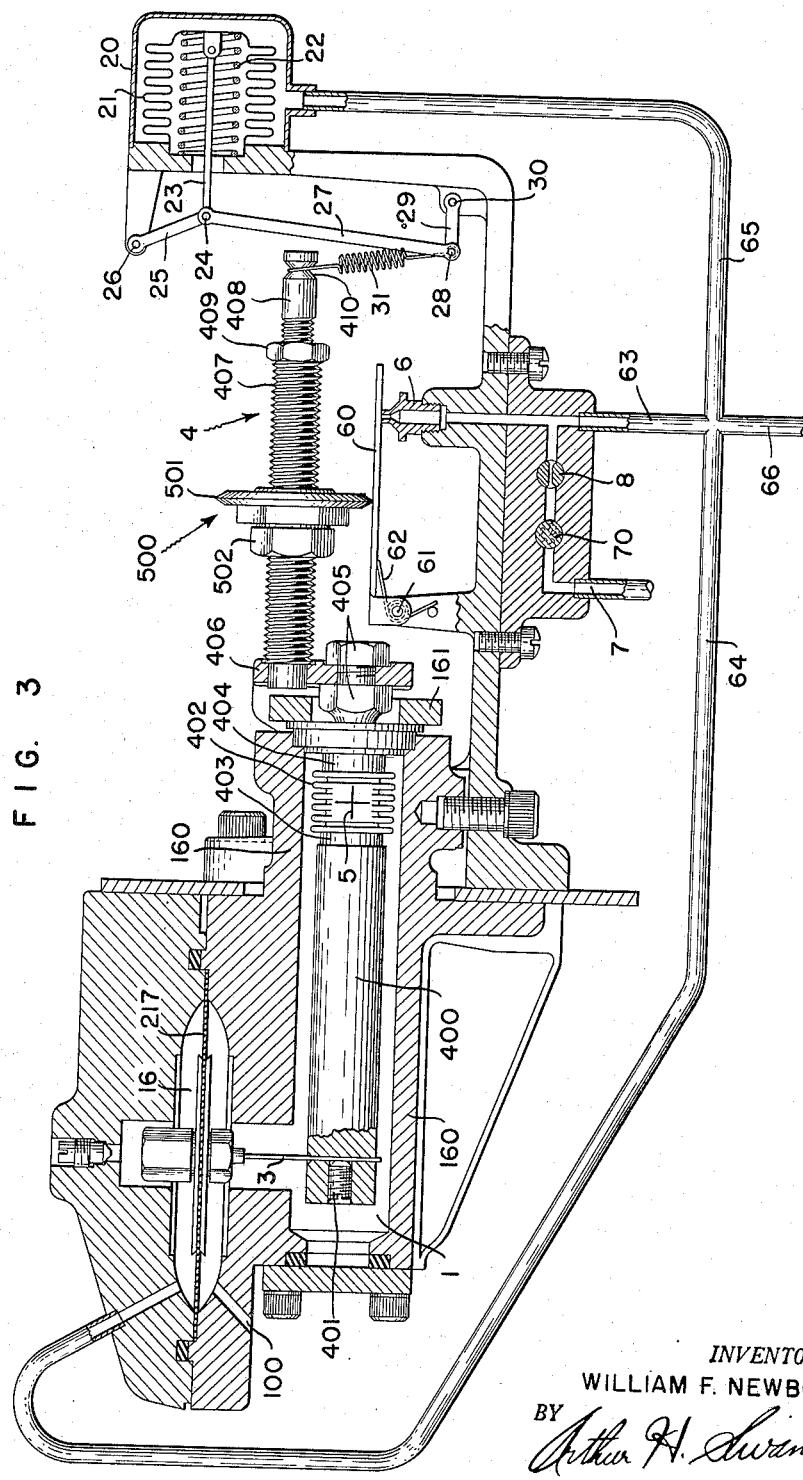
Fig. 3 is a vertical, longitudinal, cross section of a practical embodiment of the invention which differs from Fig. 2.

Fig. 3 shows a measuring instrument constructed according to the present invention. It comprises a chamber 1 to which the input pressure $P_1$ is applied through conduit 100. A diaphragm 217 separates the chamber 1 from the chamber 16 to which the output pressure $P_0$ is applied to furnish force $F_2$. The diaphragm 217 is connected by a rigid link 3 to one end of the lever (generally indicated at 4) and including a left portion 400 to which the link 3 is attached by means of a set screw 401. A sealing bellows 402 is connected at its left end 403 to the lever portion 400 and at its right end to the casing 150 which contains the input chamber 1. The sealing bellows 402 prevents the escape of pressure from around the lever where the lever 4 emerges from the chamber 1. A nut 161 serves to hold the right end 404 of the sealing bellows in position. The right end of the lever portion 400 is attached by a pair of nuts 405 to a yoke 406 which is pivoted to the casing 150 so that the axis of the pivot is at the point represented by the screw 5. Actually this pivot may be in the form of a pair of flat strips of spring metal mounted at right angles to each other so as to form a cross spring pivot, as shown in Fig. 2 at 30. The right end of the lever 40 formed by a bolt 407 which fits at its end into the yoke 406 which has its outer surface screw threaded. The right end of lever member 407 has a counterbore into which a set screw 408 threads. A lock nut 409 holds the set screw 408 in position. A groove 410 is formed in the right end of set screw 408.

A ring, generally indicated at 500, has a beveled edge 501 and is screw threaded onto the lever part 407. A lock nut 502 holds the ring 500 in adjusted position along lever part 407 so as to adjust the span of the instrument.

Air or other fluid pressure is supplied to the instrument from a source of substantially constant, filtered pressure 7 through a conduit which passes through a second filter 70 and an adjustable restriction 8 to nozzle 6.

Nozzle 6 is controlled by flapper 60 which is pivoted on the casing on shaft 61 and is stressed by spring 62 into engagement with ring 500.

The nozzle pressure is taken off through conduit 63 which has three branches. One branch 64 conducts the output pressure to the chamber 16, a second branch 65 conducts the output pressure to the interior of a casing 20 which contains a bellows 21 and a spring 22. A link 23 is pivoted at one end to the free end of bellows 21 and at the other end to pivot 24 which forms part of the cosine linkage. A second linkage 25 of the cosine linkage is mounted on a stationary pivot 26 while a third link 27 of the cosine linkage is pivoted at 28 to a fourth link 29 which is mounted on a stationary pivot at 30. Spring 31 connects the pivot point 28 of the cosine linkage to the slot 410 on lever 4.

A third branch 66 of the pneumatic circuit conducts the output pressure $P_0$ to the final control element such as a diaphragm operated valve or a pressure operated indicator, recorder or controller.

Operation

The input pressure $P_I$ is a liquid or fluid pressure proportional to the square of the variable being measured. It may be furnished directly by a measuring element or the measuring element may operate a pilot valve or relay which converts the changes in the variable being measured to changes in an air pressure. Assuming that the instrument has been properly installed and calibrated and is at balance, a change in the input pressure $P_I$ in chamber 1 causes the lever 4 to rock about its pivot 5 and thus cause ring 500 to move flapper 60 relative to nozzle 6 and thus vary the fluid pressure in conduit 63. This output pressure in conduit 63 passes through conduit 64 to chamber 16 where it is applied to the opposite side of diaphragm 217 from the input pressure $P_I$ in chamber 1. This feedback pressure gives a rebalancing component opposing the input pressure and which operates substantially linearly. The output pressure $P_0$ in conduit 63 also passes through conduit 65 to casing 20 and actuates bellows 21 and the cosine linkage so as to apply, through spring 31, a force on lever 4 which operates in the same direction as the input pressure $P_I$ and in the opposite direction to the feedback pressure $F_2$. The output of the cosine linkage operates non-linearly. As has been explained above the output pressure $P_0$ is proportional to S minus (S minus $S^2$) so that S squared multiplied by the output pressure ($P_0$) equals the input pressure ($P_I$).

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. An air-operated square root extractor, including, an input diaphragm to which is applied an input force, an output diaphragm to which is applied an output force varied in consequence of said input force and an error-compensating bellows to which is applied said output force, a linkage operated by said error-compensating bellows and having an output proportional to S minus S squared, where S is the per unit full scale value of the output pressure, and a movable member adapted for movement in one direction by said input diaphragm and by the output of said linkage, and in the opposite direction by said output diaphragm so that S squared multiplied by the output pressure equals the input pressure at static balance.

2. An air-operated square root extractor, including, a movable input member to which the input pressure is applied, a movable output member to which the output pressure is applied, a movable error-compensating member to which the output pressure is applied, a linkage moved by said error-compensating member so that its output is proportional to S minus S squared where S is the per unit full scale value of the output pressure, and a pivoted lever moved in one direction by said input member and by the output of said linkage and moved in the opposite direction by said output member so that S squared multiplied by the output pressure equals the input pressure when said lever is statically balanced.

3. An air-operated square root extractor according to claim 2 in which there is provided a spring between said lever and the output of said linkage.

4. An air-operated square root extractor according to claim 2 in which said output pressure is varied in the same direction as said input pressure by movement of said lever.

5. An air-operated square root extractor according to claim 2 in which said lever moves relative to a nozzle to vary the exhaust of air through said nozzle, and a pilot valve controlled by said nozzle, the output of said pilot valve being the output pressure.

6. An air-operated square root extractor, including, an input chamber having a movable wall to which an input pressure is applied, an output chamber having a movable wall to which the output pressure is applied, a pivotally mounted lever, connections between said lever and said movable members whereby said movable members move said lever in opposite directions, a flapper-and-nozzle valve actuated by said lever so as to control the flow of air through said valve, a pilot valve connected under the control of said flapper-and-nozzle valve so as to be actuated by the escape of air therethrough, the output of said pilot valve forming an output pressure, a conduit connecting said pilot valve to said output chamber to conduct the output pressure thereof so that the pressure in said output chamber varies proportionally to an operator S, S being the per unit scale value of the output pressure, an error-compensating chamber having a movable member therein, a conduit connecting said pilot valve to said error-compensating chamber to conduct the output pressure thereto, a linkage actuated by the movable member of said error-compensating chamber, the output of said linkage being a force proportional to S minus S squared, and a spring connecting the output end of said linkage to said lever to actuate it in the same direction as does the input pressure, whereby S squared multiplied by the output pressure equals the input pressure when the lever is in static balance.

7. In a meter for continuously measuring the square root of a measured variable, a pivoted member, means to move said pivoted member through an angle proportional to the variations in the variable being measured, means for transforming the movements of said pivoted member into variations in a fluid pressure, and means coacting with said pivoted member to modify the movements of said pivoted member to cause it to follow the true substantially square root relation of said measured variable and comprising means to apply said variations in the fluid pressure to move said pivoted member with a linearly varying motion in the direction opposite to its movement by said first mentioned means, and second means to move said pivoted member with a non-linearly varying motion in the same direction that said pivoted member is moved by said first mentioned means.

8. A meter for indicating on a scale having equally spaced markings the variations of a measured variable, a first movable member movable in response to the measured variable proportionately to the square of the measured variable, a second movable member moved by said first movable member, means for translating movements of said second movable member into variations in a fluid pressure, a third movable member movable by linear increments in response to variations in said fluid pressure and adapted to move said second movable member in the direction opposite to that in which it is moved by said first movable member, a fourth movable member movable by linear increments in response to variations in said fluid pressure, and a linkage connecting said fourth movable member to said second movable member so as to move said second movable member in the same direction in which it is moved by said first movable member and with a movement having non-linear increments.

WILLIAM F. NEWBOLD.

References Cited in the file of this patent

UNITED STATES PATENTS

| Number | Name | Date |
|---|---|---|
| 2,190,506 | Wurr | Feb. 13, 1940 |
| 2,487,310 | Chandler | Nov. 8, 1949 |
| 2,494,781 | Stover | Jan. 17, 1950 |
| 2,520,547 | Hughes | Aug. 29, 1950 |